United States Patent [19]

Grimes

[11] 4,219,943
[45] Sep. 2, 1980

[54] TIME TEACHING CLOCK

[76] Inventor: T. Wayne Grimes, P.O. Box 388, St. Louis, Mo. 63166

[21] Appl. No.: 946,797

[22] Filed: Sep. 28, 1978

[51] Int. Cl.³ .......................................... G09B 19/12
[52] U.S. Cl. ..................................................... 35/39
[58] Field of Search ..................................... 35/39, 74

[56] References Cited

U.S. PATENT DOCUMENTS

| | | | |
|---|---|---|---|
| 2,655,739 | 10/1953 | Wilmington | 35/39 |
| 3,640,531 | 2/1972 | Penders | 35/74 X |
| 3,967,389 | 7/1976 | Brooks | 35/39 |
| 4,124,945 | 11/1978 | Totten | 35/39 |

*Primary Examiner*—Harland S. Skogquist
*Attorney, Agent, or Firm*—Cohn, Powell & Hind

[57] ABSTRACT

The teaching clock provides a visual aid to enable children to grasp fundamental time relationships. The clock includes a base member having a concentric arrangement of minute numerals, a rotatable member mounted to the base member and having a window for selectively exposing the minute numerals during rotation and a cover for the base member having a concentric arrangement of hour markers. A minute pointer, fixedly attached to the rotatable member, is directed toward the window and the exposed minute numerals and an hour pointer is movable between the hour markers independently of movement of the minute pointer. The hour markers include individual marker pips for each hour and marker segments extending between the pips, the segments being color coded to correspond with the immediately counterclockwise marker pip.

2 Claims, 4 Drawing Figures

TIME TEACHING CLOCK

BACKGROUND OF THE INVENTION

This invention relates generally to time teaching aids and particularly to a clock for teaching time fundamentals to children.

Although time teaching clocks are not in themselves new, a review of known devices reveals a tendency to use them to attempt to convey concepts which are simple to an adult, who already understands them, but which are beyond the grasp of a child. It is often forgotten by teachers that all teaching of a new subject must begin with fundamentals and this is particularly true in the case of teaching children to tell time. It is also forgotten that many young children while able to understand numerals cannot read. Thus, the aim of a time teaching device should be to provide the child with a simple association between minute and hour proportions and to do this with a teaching device which is essentially simple in construction and can be understood without reading ability.

The most pertinent known reference with respect to the instant device is U.S. Pat. No. 3,967,389. This patent discloses a somewhat complex time telling teaching aid which includes a minute hand linked at its remote end with a rotating minute ring having a selector window for reading double rows of numerals relating to "time before" the hour as well as "time after", thereby attempting to teach comprehension of more than one concept at one time. A relatively complicated color coded system is used which divides each of the twelve thirty degree (30°) hour circle intervals into five twelve minute portions and relates these to five seventy-two degree (72°) twelve minute intervals on the minute circle. The color system also relates to the "time before" the hour and "time after" the hour minute indication and appears to require at least a degree of reading ability.

The present teaching clock overcomes the above problems in a manner not disclosed by the known prior art.

SUMMARY OF THE INVENTION

This teaching clock provides a means of teaching time fundamentals to young children by visual association of minute and hour proportions. The device can be readily understood by children without reading ability and is easy to use because of the relatively simple construction.

The teaching clock includes a body having a pivot axis and having minute and hour indicia recorded thereon concentrically about the pivot axis; a rotatable member having an inner hub portion and an outer portion provided with a window spaced from the pivot axis to expose the minute indicia as the member rotates. A minute pointer directed toward the window is fixedly attached to the hub portion for rotation with the rotatable member and an hour pointer is pivotally mounted to the base member for rotation relative to the hour indicia independently of the rotatable member.

The hour indicia includes twelve marker pips bearing consecutive hour reference numerals and twelve marker segments extending between said marker pips, each marker pip being color coded to distinguish it from the marker pip on each side thereof and each marker segment being color coded to correspond to the marker pip immediately counterclockwise thereof.

The body includes a base member and a cover member cooperating to provide a housing for the rotatable member. The cover includes a coaxial circular opening and the rotatable member hub extends through said opening above the cover so that the minute pointer attached thereto is spaced from said cover.

The minute indicia is on the base member and the hour indicia is on the cover member, said minute indicia occurring only at points aligned with said hour pips. The base member includes a coaxial relatively recessed circular portion defined by a relatively raised outer edge portion which provides support for the cover. The rotatable member is disposed within the recessed portion of the base and the outer portion thereof includes a peripheral cut-out defining the minute indicia exposing window.

Figure 1:
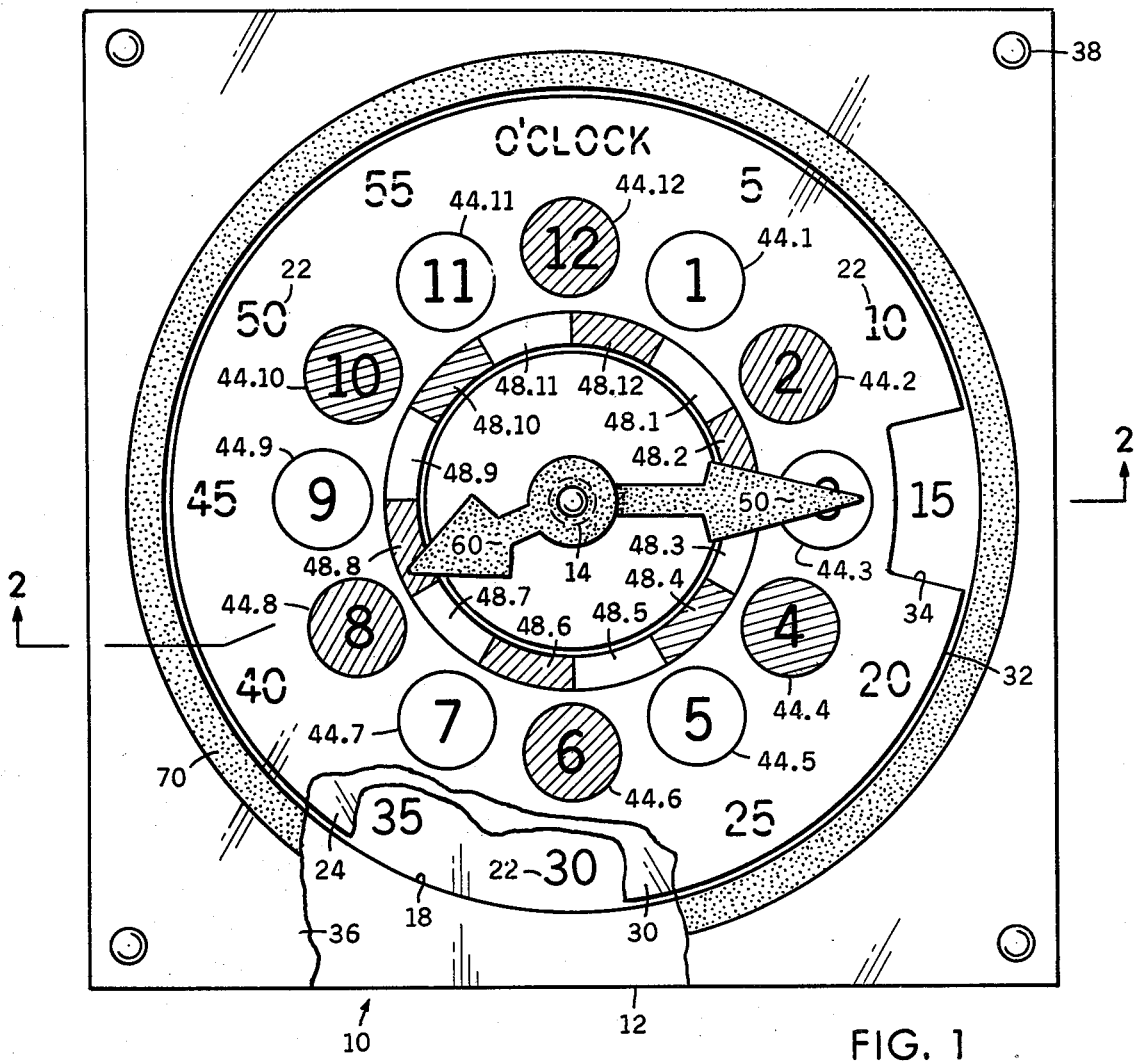
FIG. 1 is a front elevational view of the clock.
Figure 2:
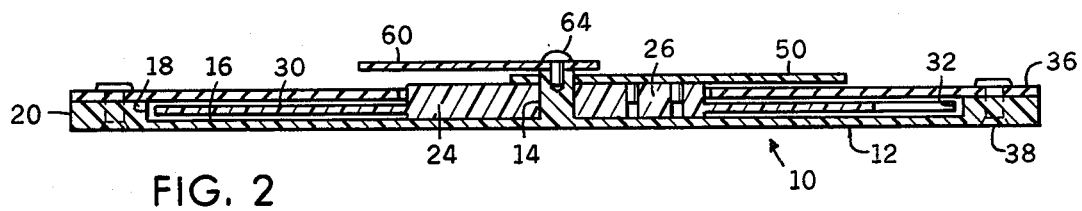
FIG. 2 is a cross sectional view taken on line 2—2 of FIG. 1.
Figure 4:
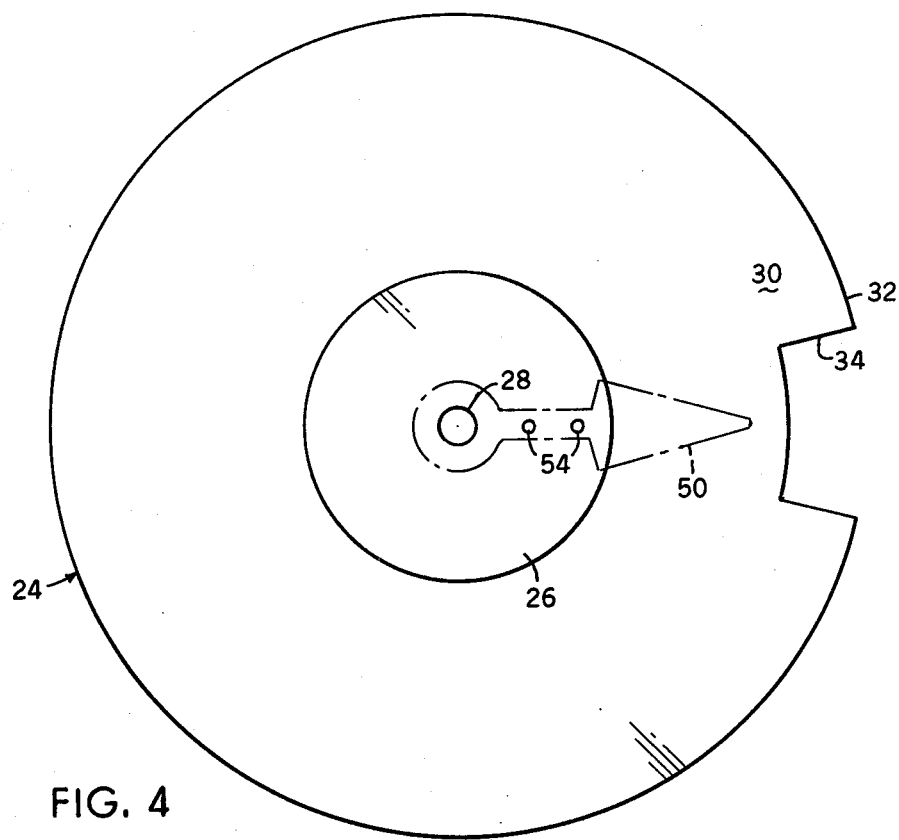
FIG. 4 is a front elevational view of the rotatable member.
Figure 3:
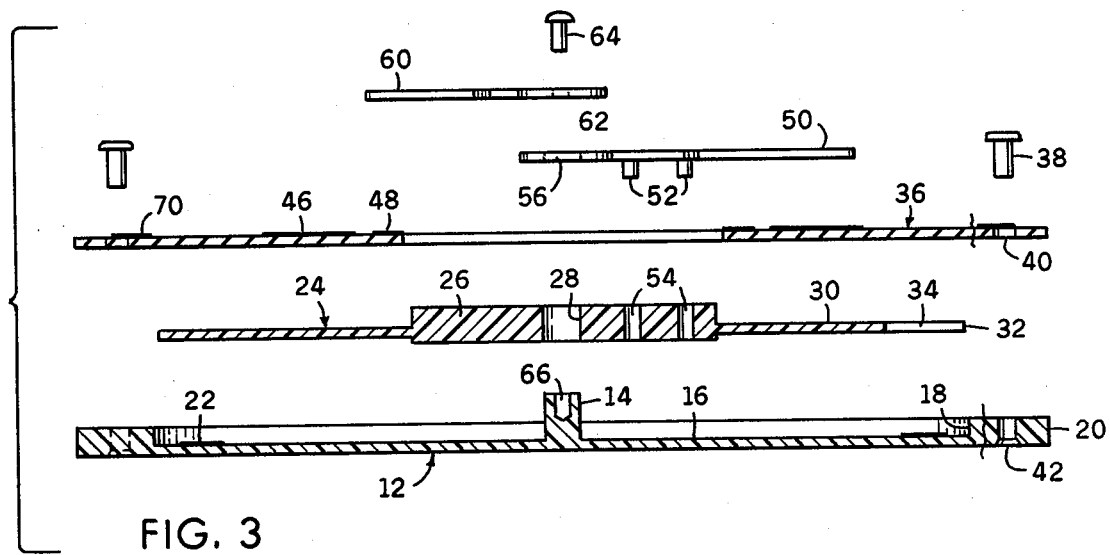
FIG. 3 is an exploded view similar to FIG. 2 illustrating the parts of the clock.

DESCRIPTION OF THE PREFERRED EMBODIMENT:

Referring now by reference numerals to the drawings and first to FIGS. 1, 2 and 3, it will be understood that the teaching clock includes a housing generally indicated by numeral 10 and constituting a body. As shown in FIG. 2, the housing 10 consists essentially of a first portion provided by a base member 12 and a second portion provided by a cover member 36, said members together providing a housing for a relatively rotatable member 24, as will be described. The base member 12 of plastic, cardboard, or the like, includes a central post 14 defining a pivot axis and a relatively recessed portion 16. The recessed portion 16 is coaxial with said pivot axis, as shown in FIG. 3, and includes an outer margin 18 defining a relatively raised edge portion 20. As shown in FIG. 1, the recessed portion 16 is provided with minute indicia disposed in a concentric circle adjacent the margin 18 at thirty degree (30°) spaced intervals and generally indicated by numeral 22. The minute indicia 22 are twelve in number and commence with "O'CLOCK" indication and read consecutively clockwise at five (5) minute intervals, beginning with the numeral five (5), and terminating with the numeral fifty-five (55).

The rotatable member 24, of plastic, cardboard, or the like, is mounted to the base member 12 for rotation within the recessed portion 16. The rotatable member 24 includes an inner hub portion 26 having a central opening 28 received by the base post 14 in rotatable relation and an outer portion 30 having a circular margin 32 interrupted by a cut-out portion 34 which constitutes a window. The window cut-out portion 34 is disposed in spaced radial relation from the pivot axis so that, as shown in FIG. 1, the cut-out portion 34 selectively exposes the minute indicia 22 consecutively as the rotatable member 24 rotates in a clockwise direction. It will be understood that at least the outer portion 30 is opaque so that the minute indicia not exposed by the cut-out portion 34 remain hidden.

The cover member 36, of transparent plastic, celluloid, or the like, is, in the preferred embodiment, of the same overall size as the base member 12. The cover member 36 is substantially in register with said base member and is attached thereto by fasteners 38 received within openings 40 and 42 provided in said cover and base respectively. As shown in FIG. 1, the cover member 36 includes a coaxial opening 44 which receives the rotating member hub portion 26 therethrough. As clearly indicated in FIG. 2, the thickness of the hub portion 26 is sufficiently great to project slightly beyond the upper face of the cover member 36. The transparent cover 36 is provided with hour indicia which include twelve marker pips indicated by numeral 44 together with the appropriate hour numeral, e.g., 44.12, 44.1, etc. A marker ring 46 is disposed radially inward of said marker pips 44, said ring being divided into twelve substantially equal segments extending substantially over a thirty degree (30°) arc between the marker pips, and said segments being indicated by numeral 48 together with the appropriate hour numeral, e.g., 48.12, 48.1, etc. Importantly, each marker pip is color coded to distinguish it from the marker pips on each side thereof and each segment is color coded to correspond with the marker pip immediately adjacent to the counterclockwise end thereof. In the preferred embodiment, this is accomplished by making each marker pip 44 a different color from any other pip and each associated segment the same color. Thus, for example, the pips 44.12, 44.1, and 44.2 may be colored blue, red, and green respectively and the segments 48.12, 48.1, and 48.2 associated with said marker pips would likewise be colored blue, red, and green respectively. In the embodiment shown, the colors beige, pale blue, pale yellow, purple, orange, grey, yellow, magenta and brown have been used consecutively in addition to blue, red and green. These colors have been found to be effective in use but it is not essential that twelve different colors be chosen as long as a pip and its corresponding segment are, in someway, distinguished from those on either side of them.

A minute pointer generally indicated by numeral 50 is fixedly attached to the rotatable member hub portion 26 as by the provision of peg-like members 52 which, as shown in FIG. 3, are received in openings 54 and are secured therein as by adhesive. In the embodiment shown, the pointer 50 also includes an opening 56 which receives the base post 14 therein. As will be readily understood, when fixed in position, the minute pointer points directly to the rotatable member cut-out portion 34 and the thickness of the hub portion 26 is sufficient so that said hub portion projects outwardly of the cover opening 44. The result of this is that the pointer 50, which is, in effect, an integral part of the rotatable member, is spaced slightly above the upper face of the cover member 36 and can be used to rotate the rotatable member.

An hour pointer 60 is disposed above the minute pointer 50 and is independently movable relative to said minute pointer 50. In the embodiment shown, this is accomplished by the provision, in the hour pointer 60, of an opening 62 which receives a fastener 64 which is disposed within a socket 66 provided in the base post 14 and secured to said post as by adhesive. It is preferred that the fastener attachment of the pointer 60 be such that there is some frictional engagement between said pointer and fastener so that the pointer 60 can be moved but is not completely freely rotatable. As clearly shown in FIG. 1, the length of the pointer 60 is such that the remote end is disposed between the inner and outer margins of the hour marker ring 46 to facilitate the time reading.

In the embodiment shown, an annular overlay 70 of opaque material is provided over the transparent material of the cover 36 and defines the clock face provided by the recess 16 more clearly and in particular defines the window provided by the cut-out 34.

It is thought that the structural features and functional advantages of this teaching clock have become fully apparent from the foregoing description of parts, but for completeness of disclosure, the operation of the clock will be briefly described.

In the assembled condition of the clock 10, as shown in FIG. 1 and 2, the rotatable member 24 rotates relatively freely on the base post 14. As said rotatable member is rotated, as by applying the index finger to the side of the pointer 50, the minute numerals, five (5), ten (10), etc., are selectively exposed. It will be assumed that the time example to be illustrated is eight-fifteen (8:15) - the example shown in FIG. 1. For this example, the rotatable member 24 is rotated until the fifteen (15) minute numeral is exposed and centered in the cut-out portion 34 at which time the pointer 50 is directed at the fifteen (15) minute numeral and is aligned with the three (3) hour marker pip. The hour pointer 60 is then moved to a position approximately one-quarter of the way between the eight (8) and nine (9) hour marker pips 44.8 and 44.9 respectively which is, of course, also one-quarter of the arcuate distance on the hour segment 48.8 between these two marker pips. Because of the fact that the marker segment 48.8 is color coded to correspond with the eight (8) hour marker pip 44.8 the child learner associates the fifteen (15) minute indication with said eight (8) hour marker pip rather than with the nine (9) hour marker pip which is color coded differently.

When it is desired to provide an example such as eight forty-five (8:45), the minute pointer 50 and cut-out 34 are rotated clockwise to expose the forty-five (45) minute numerals. The hour pointer 60 is moved three-quarters of the distance between the hour segment 48.8 which lies between the eight (8) and nine (9) hour marker pips. Thus, the time eight forty-five (8:45) is clearly understood by the child because of the association between the color coding correspondence between the marker pip 44.8 and the marker segment 48.8.

For the nine (9) o'clock example, the minute pointer 50 is rotated until the cut-out portion 34 exposes the "O'CLOCK" indication. The hour pointer 60 is moved into a position in which it is aligned with the center of the nine (9) hour marker pip 44.9 and the beginning of the marker segment 48.9.

This procedure provides a means by which the child associates basic hour proportions and with the corresponding number of minutes represented. The complexities of understanding "quarter after", "half hour", and "quarter 'til" and other time associations can be built rapidly once this fundamental association has been achieved.

I claim as my invention:
1. A time teaching clock comprising:
(a) a body including a pivot axis, said body including a base member having minute indicia recorded thereon in concentric relation about the pivot axis and a cover member fixedly attached to said base member and having hour indicia recorded thereon in concentric relation about the pivot axis and a transparent portion extending over said minute indicia said cover member having a coaxial circular opening, (b) a rotatable member pivotally mounted to said body and disposed between said base member and said cover member, said rotatable member including an inner circular hub portion received within said central opening and an integrally formed outer portion having a window cut-out portion disposed in spaced radial relation from said pivot axis to selectively expose the minute indicia on the base member as said window portion rotates below said transparent cover portion, (c) a minute pointer fixedly attached to the inner hub portion of the rotatable member at the inner end and having a free outer end disposed above the cover member and directed radially outward toward said outer portion window cut-out portion, and (d) an hour pointer mounted in pivotal relation to the body member for rotatable movement relative to the hour indicia and independently of the rotatable member.

2. A time teaching clock as defined in claim 1, in which:

(e) said hour indicia includes twelve marker pips bearing consecutive hour reference numerals and a marker ring disposed radially inwardly of said marker pips and divided into twelve equal segments extending substantially over a thirty degree (30°) arc between the marker pips, each marker pip being color coded to distinguish it from the marker pips on each side thereof and each marker segment being color coded to correspond with the marker pip immediately counterclockwise thereof, and (f) the rotatable member hub extends radially substantially to the marker ring.

* * * * *